Figure 2:
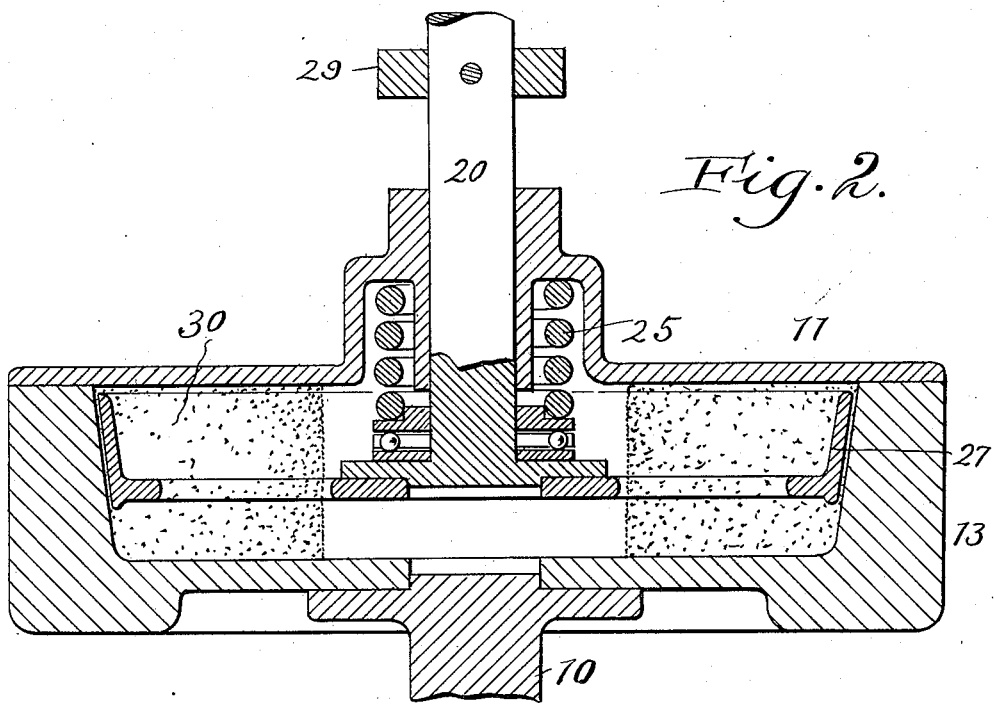

A. P. BRUSH.
FRICTION CLUTCH.
APPLICATION FILED AUG. 6, 1917.

1,271,424.

Patented July 2, 1918.

Inventor:
Alanson P. Brush
By Thurston & Rivoire
attys.

UNITED STATES PATENT OFFICE.

ALANSON P. BRUSH, OF DETROIT, MICHIGAN.

FRICTION-CLUTCH.

1,271,424.  Specification of Letters Patent.  Patented July 2, 1918.

Application filed August 6, 1917. Serial No. 184,578.

*To all whom it may concern:*

Be it known that I, ALANSON P. BRUSH, a citizen of the United States, residing at Detroit, in the county of Wayne and State of Michigan, have invented a certain new and useful Improvement in Friction-Clutches, of which the following is a full, clear, and exact description.

This invention relates to friction clutches; and the object is to increase the efficiency and durability, and to cheapen the construction of such mechanisms.

The principle of the invention involves that the friction surfaces of the clutch mechanism be inclosed within a suitable casing, and that said casing shall contain such a quantity of loose, dry, powdered graphite or its equivalent as will substantially bury said friction surfaces when the casing is in rotation.

The invention consists in the combination shown in the drawings and hereinafter described, and definitely pointed out in the appended claims.

Figure 1:
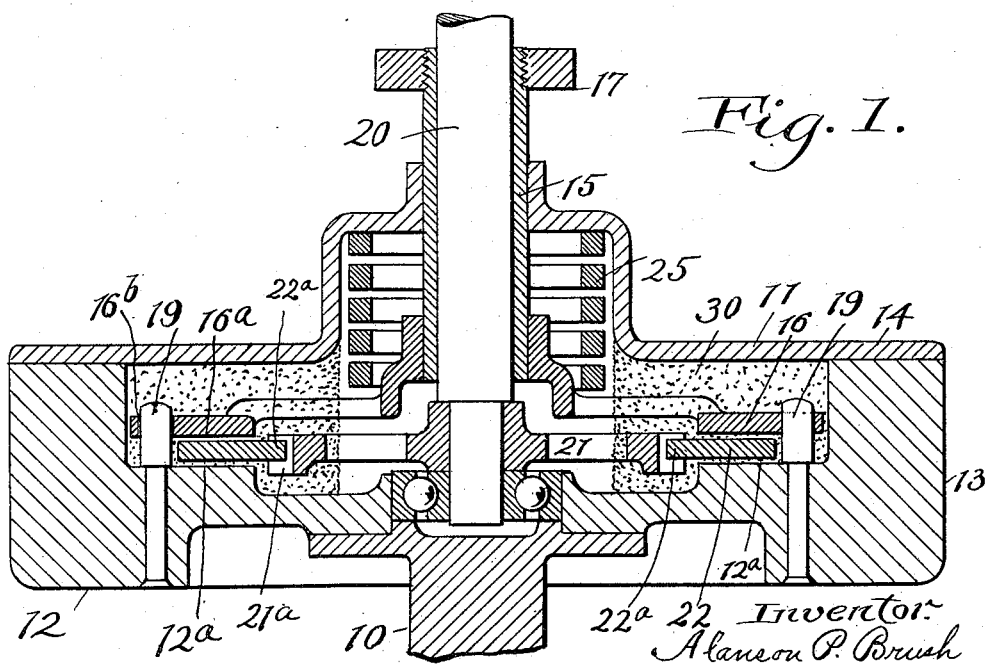

In the drawings, Figure 1 is a longitudinal sectional view of the invention embodied in disk form of clutch; Fig. 2 is a similar view of the invention embodied in a cone clutch.

The invention is quite independent of the character of the clutch mechanism, as will be apparent from what follows, as well as from the fact that the figures of the drawing show the two forms of clutch mechanism above mentioned.

Referring to the parts by reference characters, 10 represents the driving shaft. This invention is particularly intended for use on automobiles, and therefore this driving shaft may be the crank shaft of the motor; wherefore it will be in constant rotation as long as the motor is running.

20 represents the alined driven shaft, that is, the shaft to be driven through the clutch mechanism.

The driving shaft carries at its end a casing 11 into which driven shaft 20 projects through a dust tight joint. The friction surfaces which by their frictional engagement are to transmit motion from the driving shaft to the driven shaft are inclosed within this casing; and in this casing is a quantity of loose powdered dry graphite or equivalent lubricating powder 30.

The casing consists of a plate 12 fixed to the driving shaft, which plate is formed with a heavy circumferential flange 13 whereby the fly-wheel effect is attained; and a casing cover-plate 14 which is fixed to said flange and is shaped to accommodate the parts inclosed within the casing.

So much as is above referred to is and must be common to all embodiments of the invention.

Referring, for the time being, to Fig. 1, a disk-carrier 21 is fixed to the driven shaft within the casing. A friction disk 22 is mounted on this carrier, and has a sliding, driving connection therewith,—said connection consisting, as shown, of tongues $22^a$ formed on the disk, and grooves $21^a$ in the periphery of the carrier into which said tongues project. This disk is located adjacent to a friction surface $12^a$ on the inner face of the plate 12, and between it and the closely adjacent friction surface $16^a$ of a pressure plate 16. This pressure plate is fixed to a sleeve 15 which is rotatably mounted on the shaft 20 and has a dust tight fit in the hole through which it passes in the cover plate 14.

This pressure plate has a number of holes $16^b$ near its periphery; and into these holes project pins 19 which are fixed to the plate 12. Therefore, this pressure plate must rotate with the driving shaft, but may move lengthwise thereof as required.

A spring 25, which surrounds the sleeve 15, engages the flanged end of said sleeve and the cover plate 14 and acts to thrust the pressure plate 16 toward the plate 12 and to thereby frictionally clamp the interposed disk 22 beween them.

Means to move the pressure plate 16 in the clutch releasing direction may be of any suitable construction adapted to engage some part of the projecting outer end of the sleeve, as for example, a flange 17 fixed thereto.

In the embodiment of the invention shown in Fig. 2, the inner periphery of the flange 13 is made conical to provide a friction surface. A coöperating cone 27 is secured to the inner end of the driven shaft within the casing. In this construction, as shown, the driven shaft must be moved endwise to cause the setting and releasing of the clutch. Any suitable mechanism may be employed to produce this result and a flanged ring 29 may be fixed to the driven shaft for this mechanism to engage with.

With both constructions shown it is contemplated, as stated, that the driving shaft shall be in constant rotation. Therefore the loose powdered graphite will be thrown by centrifugal force away from the axis of the shaft, and therefore between the friction surfaces, when the clutch is released. When the spring 25 is permitted to thrust the friction surfaces toward each other, a quantity of this loose powdered graphite will be imprisoned between these surfaces; and will be gradually squeezed from between said surfaces, until only a very thin compressed film of this material is left.

I am aware that it has been common to use oil with incased friction clutch surfaces, and that the oil acts similarly to the graphite powder as above described. Oil, however, can be and frequently is entirely squeezed from between the friction surfaces, thus allowing the metal surfaces to come into direct contact, and to wear when they move relatively. But the graphite powder can never be entirely squeezed from between the friction surfaces; and therefore such surfaces can never come into actual wearing contact. Moreover, the small particles which remain, will, when compressed, adhere to one surface or the other, and will interlock with one another, thereby producing a substantially positive final drive that has this advantage over the interlocking jaw positive drive clutches; heretofore used, to wit, that when the latter are subjected to unusual severe strains, the jaws may be broken, whereas with the clutch herein described such severe strains will thereby break the interlocking compressed particles of the graphite powder.

It will be seen, therefore, that the described clutch is such that it will act as a friction clutch when relative slippage is desired, but will become in effect a positive drive clutch when such action is desired; and that it does not have some of the inherent defects of friction clutches or positive drive clutches as they are commonly constructed.

Another advantage of the present construction over a clutch having oil in its casing is that with the latter the casing must be oil tight at all points, whereas with the present construction the joints need only be dust tight,—a cheaper construction. Also the oil deteriorates with use, and fresh oil must be substituted from time to time, which is not the case with the graphite powder.

Having described my invention, I claim:—

1. The combination of a rotatable driving member, an alined rotatable driven member, friction surfaces carried respectively by said members, means to move said friction surfaces toward and from each other, a dust tight casing around said friction surfaces, and a quantity of loose powdered dry lubricating powder within said casing.

2. The combination of a driving shaft, an alined driven shaft, a casing fixed to the driving shaft and into which the driven shaft projects, friction surfaces operatively connected with said driving and driven shafts and located within said casing, means to cause the engagement and disengagement of said friction surfaces, and a quantity of loose powdered dry graphite within said casing.

In testimony whereof, I hereunto affix my signature.

ALANSON P. BRUSH.